US006975865B1

(12) United States Patent
Väisänen

(10) Patent No.: US 6,975,865 B1
(45) Date of Patent: Dec. 13, 2005

(54) METHOD FOR CHANNEL CONFIGURATION OF CELLULAR RADIO NETWORK, AND CELLULAR RADIO NETWORK

(75) Inventor: Veijo Väisänen, Jääli (FI)

(73) Assignee: Nokia Networks Oy, Espoo (FI)

( * ) Notice: Subject to any disclaimer, the term of this patent is extended or adjusted under 35 U.S.C. 154(b) by 600 days.

(21) Appl. No.: 09/762,052

(22) PCT Filed: Jun. 2, 2000

(86) PCT No.: PCT/FI00/00494

§ 371 (c)(1),
(2), (4) Date: Feb. 1, 2001

(87) PCT Pub. No.: WO00/76242

PCT Pub. Date: Dec. 14, 2000

(30) Foreign Application Priority Data

Jun. 4, 1999 (FI) .................................... 991285

(51) Int. Cl.[7] .............................................. H04Q 7/20
(52) U.S. Cl. ...................... 455/444; 455/450; 455/451; 455/452.1; 370/329; 370/331
(58) Field of Search ................................. 455/423, 424, 455/425, 444, 450, 451, 452.1, 452.2; 370/329, 370/331

(56) References Cited

U.S. PATENT DOCUMENTS

| 5,247,701 | A | | 9/1993 | Comroe et al. | |
|---|---|---|---|---|---|
| 5,963,865 | A | * | 10/1999 | Desgagne et al. | ........... 455/450 |
| 6,023,622 | A | * | 2/2000 | Plaschke et al. | ........... 455/452.2 |
| 6,091,954 | A | * | 7/2000 | Haartsen et al. | ............ 455/447 |
| 6,112,092 | A | * | 8/2000 | Benveniste | ................... 455/450 |
| 6,163,698 | A | * | 12/2000 | Leitch et al. | ................ 455/450 |
| 6,175,735 | B1 | * | 1/2001 | Meyer | ......................... 455/440 |
| 6,205,336 | B1 | * | 3/2001 | Ostrup et al. | ................ 455/444 |
| 6,212,386 | B1 | * | 4/2001 | Briere et al. | ................. 455/447 |
| 6,330,429 | B1 | * | 12/2001 | He | ........................... 455/67.11 |
| 6,351,643 | B1 | * | 2/2002 | Haartsen | ...................... 455/450 |
| 6,442,151 | B1 | * | 8/2002 | H'mimy et al. | ............. 370/333 |
| 6,496,700 | B1 | * | 12/2002 | Chawla et al. | ............ 455/435.2 |

FOREIGN PATENT DOCUMENTS

| EP | 0866628 | 9/1998 |
|---|---|---|
| WO | WO 98/09466 | 3/1998 |
| WO | WO 98/39939 | 9/1998 |

* cited by examiner

*Primary Examiner*—Stephen M. D'Agosta
(74) *Attorney, Agent, or Firm*—Pillsbury Winthrop Shaw Pittman LLP

(57) ABSTRACT

A method for performing channel configuration in a cellular radio network for office use located in the operating area of a macro cell network, and a cellular radio network employing the method are disclosed. A logical control channel to be transmitted on a physical channel of a macro cell in the macro cell network is selected as the channel to be tested. A base station of the cellular radio network for office use and terminals in the coverage area of the base stations in the cellular radio network for office use are directed to use the channel to be tested. A connection is established by remote control between two or more terminals through the serving base stations on the channel being tested, and a measurement report is made concerning the quality of the connection. The base stations are directed to use the channels guaranteeing the best range.

22 Claims, 4 Drawing Sheets

METHOD FOR CHANNEL CONFIGURATION OF CELLULAR RADIO NETWORK, AND CELLULAR RADIO NETWORK

This application is the national phase of international application PCT/FI00/00494 filed Jun. 2, 2000.

FIELD OF THE INVENTION

The invention relates to a method for performing channel configuration of base stations in a cellular radio network intended for office environments, and an apparatus implementing the method.

BACKGROUND OF THE INVENTION

In a cellular radio network system, the size of cells may vary according to the predicted traffic amount of an area, for instance. In a sparsely populated area, the cells often are large macro cells, whereas in population centres, the reuse of frequencies must be more efficient, which aim is reached by reducing the size of cells, i.e. by using micro or pico cells. A micro cell covers a multi-storey office building, for instance, or a section of a street, whereas a pico cell covers an area of a few offices inside a building, for instance. The diameter of a pico cell is typically from a few meters to a few dozen meters, while the transmission power level of the base station is a few dozen or hundred milliwatts, the size of a micro cell is in the range of 10 to 400 meters, and macro cells may be several kilometres in size, while the transmission power level is dozens of watts.

In practise, the structure of cellular radio networks in population centres are often such that a network formed by macro cells, such as a GSM network (890 to 915 MHz in uplink direction and 935 to 960 MHz in downlink direction), uses a different frequency band than a micro cell network, such as a DCS network (1710 to 1785 MHz in uplink direction and 1805 to 1880 MHz in downlink direction), whereby the traffic of one network does not cause interference to that of the other.

Frequency planning becomes, however, more complicated if networks using the same frequency range have overlapping coverage areas having different cell sizes. Such a situation arises, for instance, when office base station networks comprising micro or pico cells and operating on GSM frequencies operate on the coverage area of a GSM network comprising macro cells and operating in a densely populated area. One solution to using frequencies in such a situation is to allocate a certain frequency range to the macro cell network and another to the micro cell network from the frequency band allocated to the GSM network. Alternatively, the micro cell network can be implemented in such a manner that the channels it requires are dynamically borrowed from temporarily unused channels of the macro cell network. With respect to the capacity of the macro cell network, neither solution leads to a satisfactory result.

The frequency planning of a micro cell network can also be implemented using fixed channel allocation (FCA) and the same frequency space with the macro cell network, whereby the operation of the micro cell network must be ensured by careful frequency planning so as to prevent the macro cell network which has a higher transmission power level from causing interference to the traffic of the micro cell network. Especially in situations where changes are made to the frequency usage of the macro cell network, the operation of the micro cell network must be ensured by a fast re-planning and re-selection of frequencies and a network operation testing combined to them. Today, the testing of the frequency set to be used is, in practice, done manually by measurement personnel. The drawback is that the testing is slow and laborious, for instance in measurements done at night or repeated regularly.

BRIEF DESCRIPTION OF THE INVENTION

It is thus the object of the invention to implement a method and an apparatus implementing the method so as to solve the above problems. This is achieved by the method disclosed in the following. The method in question is a method for performing channel configuration in a cellular radio network for office use located in the operating area of a macro cell network. In the method: a logical control channel to be transmitted on a physical channel of a macro cell in the macro cell network is selected as the channel to be tested; the base station of the cellular radio network for office use and the terminals in the coverage area of the base stations in the cellular radio network for office use are directed to use the channel to be tested; a connection is established by remote control between two or more terminals through the serving base stations on the tested channel and a measurement report is made concerning the quality of the connection; the next control channel of a macro cell in the macro cell network is selected for testing until all control channels of the desired macro cells have been tested; the channels whose use guarantees the best range in the cellular radio network for office use are decided on based on the measurement reports; the base stations of the cellular radio network for office use are directed to use the channels guaranteeing the best range.

The invention also relates to a cellular radio network comprising one or more macro cell base stations, each coverage area being a macro cell and the macro cells forming a macro cell network; a cellular radio network for office use operating in the operating area of the macro cell network, which cellular radio network for office use comprises at least one base station and at least one terminal in radio connection with the base station. The cellular radio network also comprises a controller coordinating channel configuration, which controller comprises means for selecting as the channel to be tested a logical control channel to be transmitted on a physical channel of a macro cell, means for directing a base station of the cellular radio network for office use to use the channel to be tested, means for establishing by remote control a connection between two or more terminals through base stations serving the terminals on the channel to be tested, means for making a measurement report concerning the quality of the connection, means for selecting the next macro cell control channel for testing until all control channels of the desired macro cells have been tested, means for deciding on the basis of the measurement reports the channels whose use guarantees the best range in the cellular radio network for office use, and means for directing the base stations to use the channels guaranteeing the best range.

Preferred embodiments of the invention are set forth in the dependent claims.

The invention is based on the idea that the channels used in a cellular radio network for office use using the same channel space and operating in the operating area of a macro cell network are found by utilizing the continuous transmission on the control channels of the macro cell network. The method of the invention and the apparatus employing the invention makes it possible to automate the channel configuration of a cellular radio network for office use.

The method and system of the invention provide several advantages. Since in the method of the invention channel configuration is performed automatically by means of a separate application, the configuration can be performed during the night, for instance, before any changes made to the macro cell or weekly to ensure the operation of the network. Automatic selection of optimal channels by means of computers is quite fast and less susceptible to errors than a manual configuration. The method and apparatus of the invention thus ensure the operation of a cellular radio network for office use in a situation where macro and micro cell networks use the same channel space.

BRIEF DESCRIPTION OF THE FIGURES

In the following, the invention will be described by means of preferred embodiments with reference to the attached drawings in which.

DETAILED DESCRIPTION OF THE INVENTION

Figure 4:
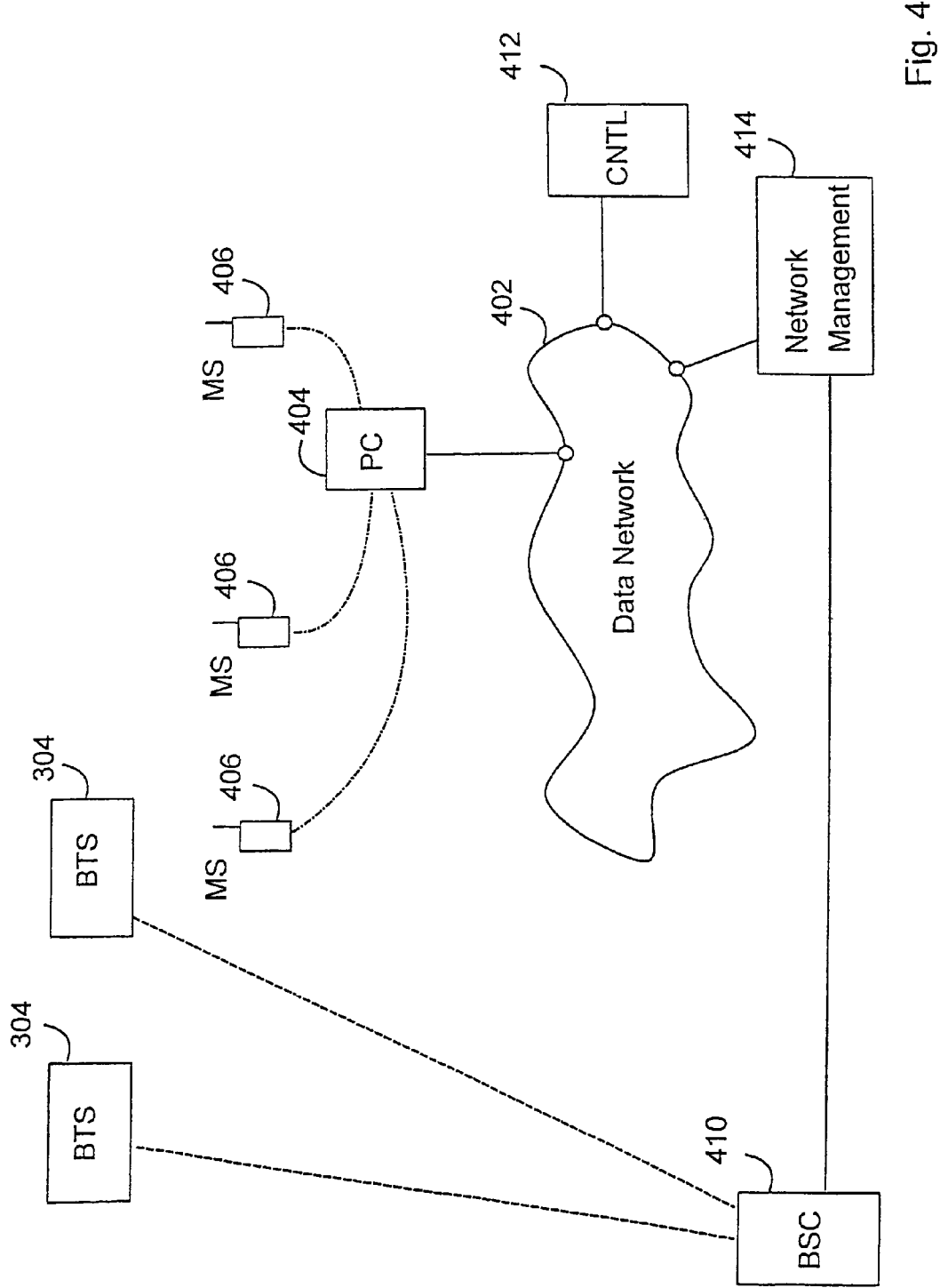
FIG. 4 shows a cellular radio network for office use of the invention.

In the following, the invention will be described in a GSM cellular radio network employing TDMA (time division multiple access) without, however, being limited to such a network. Thus in the described example, a physical channel refers to a frequency/time-slot combination, but in other types of systems, a physical channel can be implemented in another manner, for instance in a CDMA (code division multiple access) system as a frequency/spreading code combination. The solution of the invention can also be implemented in a hybrid system employing several multiple access methods simultaneously. The described cellular radio network for office use can be a normal cellular radio network in structure as shown in FIG. 4, or it can be implemented so that the base stations are connected to each other through a local area network of the office. In such a case, the base station controller resides in the same local area network and is connected through an interface to a data network, such as an IP network. Even though the following describes the invention with reference to a cellular radio network operating in an office environment, it is clear that the solution of the invention for performing channel configuration can also be implemented in factories, temporary camping environments or corresponding cellular radio networks made up of pico or micro cells operating in the operating area of a macro cell network.

Figure 1:
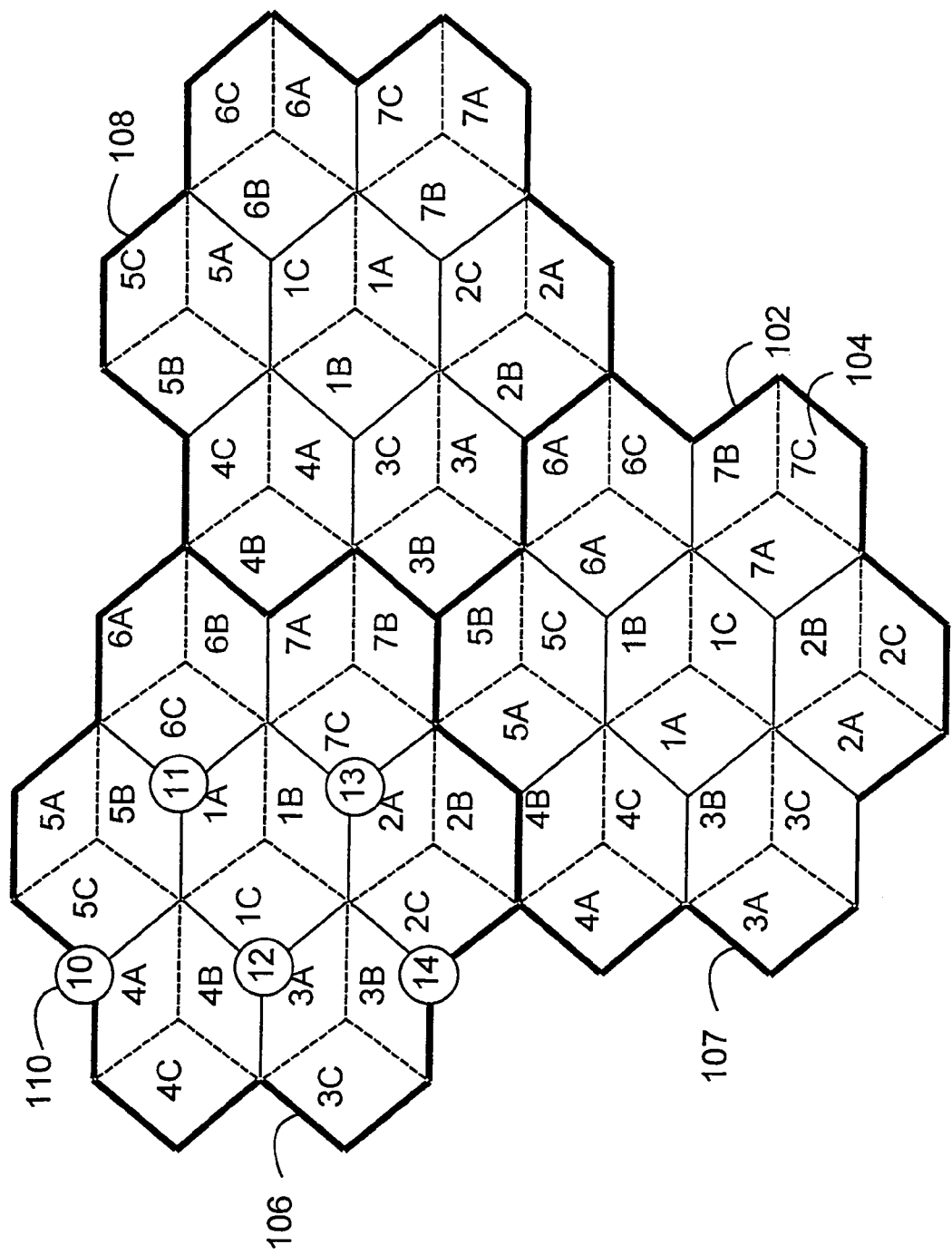
FIG. 1 shows a cellular radio network having both macro and micro cells.

FIG. 1 shows a cellular radio network comprising macro cells 102, each transmitting to three sectors 104 and divided from each other by dashed lines in the cells 102. Cell groups 106 comprising seven cells have been formed of the macro cells 102, the cell groups being outlined by a thicker line in FIG. 1. FIG. 1 also shows a group of micro cells 110 in the cellular radio network, the micro cells being numbered from 10 to 14.

The macro cell network shown in FIG. 1 comprises cells 102 having three sectors, and frequencies a, b and c, on which the transmission to the various sectors 104 takes place, are marked in each cell. The cells 102 are shown as hexagons, which illustrates the theoretical coverage area of the base station of the cell. In practice, the coverage area of the cells is not necessarily a hexagon, but the size of the cell depends decidedly on the contour of the terrain and the existence of buildings, for instance. In practice, cells overlap and are partly on top of each other to achieve as good as possible a range. Depending on the required capacity, the letters a, b and c of the cell sectors can also be thought to describe frequency groups comprising several frequencies instead of individual frequencies. Cell groups 106 to 108 comprising seven cells 102 have been formed of the macro cells 102, the cell groups being outlined by a thicker line in FIG. 1. The cells of the cell group 106 up on the left transmit above and to the right on frequency range 4a, to the right and below on frequency 4b, and to the left frequency range 4c. In the adjacent cell groups 107 to 108, the transmission directions have been turned 120 degrees so that the cell group 107 transmits to the left on frequency/frequency range 6a and the cell group 108 transmits below to the right on frequency/frequency range 3a.

By way of example, a group of micro cells 110, numbered 10 to 14 and whose frequency ranges are shown in table 1, are depicted in FIG. 1 hierarchically with the macro cells described above. The table shows that the use of frequencies of the micro cells is implemented so that the interference caused by the macro cell network below to the micro cell network remains at minimum. FIG. 1 and table 1 show that if changes are made to the use of frequencies in the macro cell network, the micro or pico cell network must adapt to these changes in such a manner that new frequencies that do not suffer from interference from the macro cells are found for the micro cells.

TABLE 1

Frequency ranges used by micro cells

| Micro cell | Frequency group |
|---|---|
| 10 | 3A, 3C |
| 11 | 2B, 2C |
| 12 | 6A, 6B |
| 13 | 6B, 6C |
| 14 | 7A, 7B |

Figure 2:
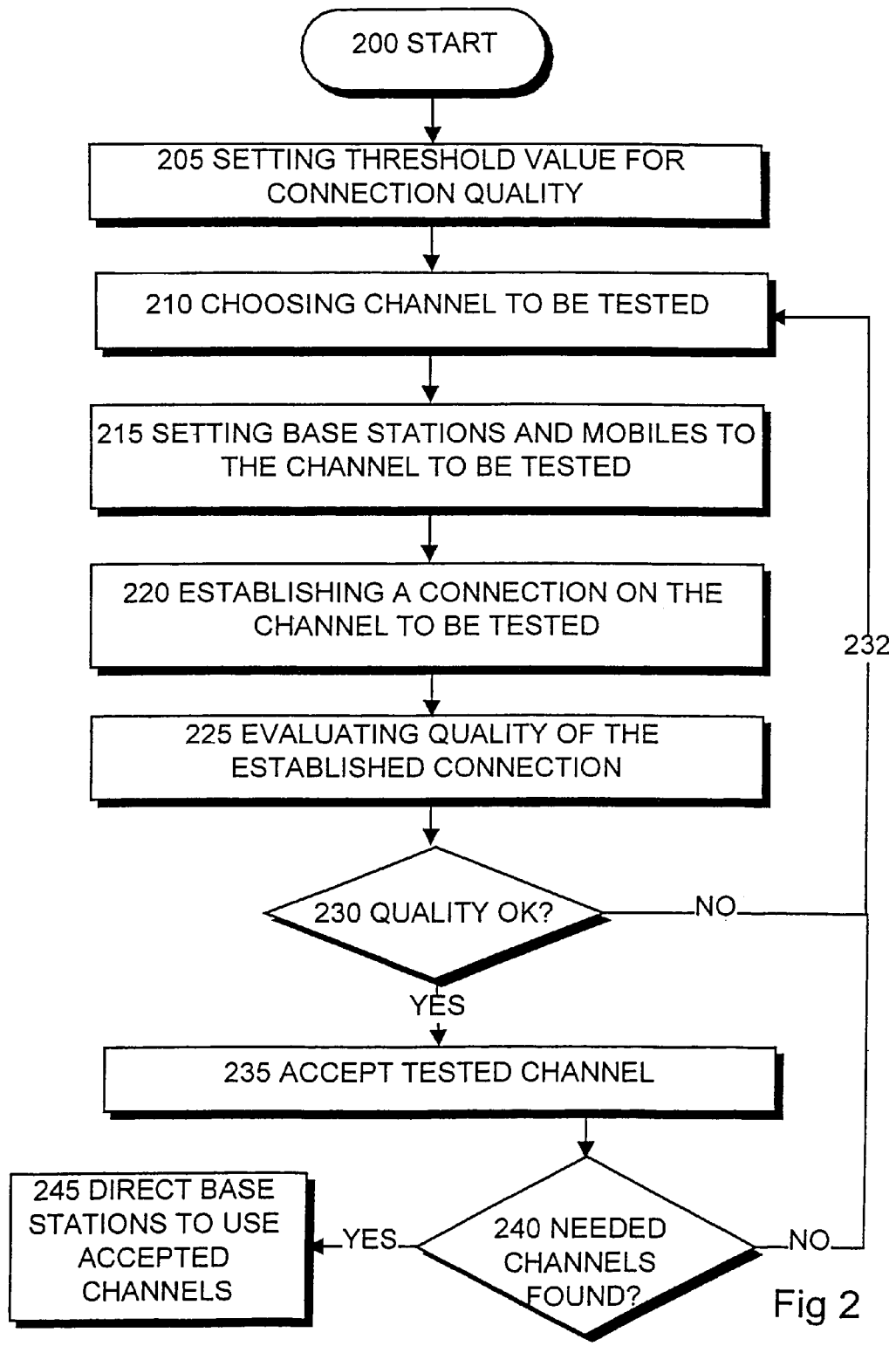
FIG. 2 is a flow chart illustrating a solution of the invention for finding frequencies in a cellular radio network for office use.

FIG. 2 shows a method of the invention for finding and testing pico/micro cell network channels. Even though in FIG. 2, channels are referred to on a general level, the following illustrates the invention in a GSM cellular radio network employing TDMA, and a channel refers to a frequency/time-slot combination. In the start step 200 of the method, the frequencies in the macro cell network have been changed or a periodic, for instance weekly, search for best frequencies is being made. A threshold value, such as a bit error rate (BER), is set in method block 205 for calls to be made in later method blocks, and the quality of calls undershooting the threshold and consequently, the used channel can be accepted. In addition to the bit error, the call quality can also be evaluated on the basis of a signal interference rate (SIR), carrier interference rate (CIR), reception power or any other known quality measurement method. If the threshold for the call quality is exceeded, the interference caused by the macro cell network is considered to be too high for the used channel, and it as well as the used frequency are rejected.

The frequency to be tested is selected in method block 210, which frequency belongs to a predefined frequency group, for instance, from which the micro cell network base stations can take frequencies for their use. In a preferred embodiment of the invention, the frequency to be tested is a BCCH (broadcast control channel) frequency of a GSM cellular radio network comprising macro cells, i.e. a physical frequency on which the cellular radio network transmits information on a logical BCCH channel to terminals. It is advantageous to use a BCCH in measurements of the invention, because said control channel has continuous traffic in the macro cell network, as the base station transmits information on the cell to the terminals in a point-to-multipoint manner. Because transmission on the BCCH channel is continuous, it is possible to perform measurements at night. On traffic channels, the measurements would not give realistic results since the amount of traffic is minimal. Network management of the micro cell network being measured and the surrounding macro cell network is preferably performed from one and the same location and with the same network management system, whereby the network management system knows the BCCH frequencies of all macro cells surrounding the micro cell network, and of the frequencies, at least the one that is the best and has the least interference is according to the invention selected for the micro cell network. Managing both networks with the same network management system also provides the advantage that the network management system knows the macro cell control channels in which the traffic volume varies strongly and which thus are possibly disturbed, and consequently, it knows not to test or select them for use in the office base station network.

The method steps from step 210 to 240 are repeated in order to go through all frequencies in the frequency group and to select the best of them for the use of the base stations or alternatively in order to end the search for frequencies when a sufficient number of good frequencies that exceed the threshold values are found. In a preferred embodiment, the best BCCH frequency is found for the office network from those of the surrounding macro cells. In method step 215, the base stations of the micro cell network and the terminals in radio connection with the base stations are set to use the frequency to be tested. Next in step 220, a call connection is set up between the terminals, whereby a radio connection is established from the terminals to the base stations serving them, or to one base station if both terminals are in the same cell. The terminal transmits a measurement report on the quality of the connection between the terminal and the base station to the base station which forwards it to the network management system. In a preferred embodiment, the micro and macro cells are managed by the same network management system and the BCCH channels of the networks are synchronised with each other. When calls are then made in the micro cell network on a BCCH frequency, it is known where in the frequency the BCCH channel is used and the call can be set up synchronised with said channel, thus making interference measurement relevant. In an alternative embodiment, if the macro and micro cell networks are not synchronised with each other, in a TDMA network a call is set up between the terminals in all time-slots of the BCCH frequency being tested, because it is not certain that the macro and micro cell networks are synchronised with each other. In the situation described above, it is possible to either first make the call in all time-slots of the frequency being tested and then compare the quality information of all connections with the threshold value, or make the calls in such a manner that after each call made in a time-slot, the quality information is compared with the threshold value. Because all time-slots are tested, the macro cell BCCH channel and the channel being tested overlap at least partly and relevant information is obtained on how much interference the macro cell network causes to the micro cell network.

In method step 225, the collected quality information of connections is compared with the threshold values set in step 210, and on the basis of this comparison, a decision is made in method step 230 on whether the used frequency is sufficiently good to be used in a micro cell network in the vicinity of a macro cell network. If the frequency does not meet the requirements set by the threshold values, the routine returns through method step 232 to step 210 where a new frequency is selected for testing; in one embodiment, this is the BCCH frequency of another cell. If the frequency, especially if it is a BCCH channel used in establishing a connection, exceeds the pre-set threshold value, it is accepted in step 235, after which the routine moves to method step 240 in which a check is made to see if the required frequencies have been found for the base stations. In practice, one frequency is usually enough for an office network due to the low transmission power levels of the base stations and, therefore, the short ranges. If there is a need to have more frequencies, the routine returns to step 210 to select a new frequency for testing. Otherwise, the search for frequencies can be stopped in step 240, and the routine can move to method step 245 in which the office base stations are directed to use the best channels found by the method. It is obvious to a person skilled in the art that in the process described above, the threshold value used as a quality indicator can be suitably altered so that a required number of frequencies are found. If during the first round of going through the pre-set frequency group, for instance, not enough frequencies are found, the threshold value, such as the bit error ratio, can be lowered and a new round of steps can be performed, in which case more frequencies meet the set threshold value.

Figure 3:
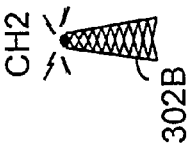
FIG. 3 shows a preferred embodiment of a solution of the invention for finding channels for a cellular radio network for office use in the operating area of a macro cell network.
Figure 3:
Figure 3:
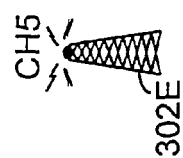
Figure 3:
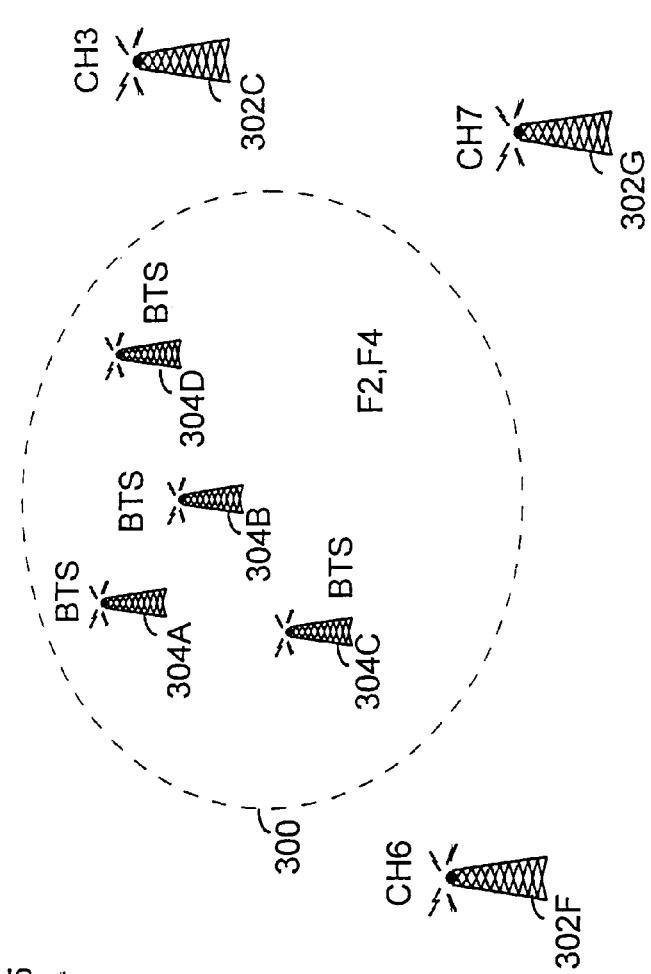

In the following, the invention will be described by means of FIG. 3 which shows a macro cell network comprising base stations 302A to 302G. To illustrate the invention, a channel group has been allocated for each macro cell base station 302A to 302G in the figure, and the base station has a radio connection with the terminals in the coverage area of the base station on these channels. In the figure, each macro cell base station 302A to 302G has a marked control channel CH1 to CH7 on which the macro cell base station signals information on the cell to the terminals within the area of the cell. An office network 300 comprising office base stations 304A to 304D is located in the operating area of the macro cell network. According to the method shown in FIG. 2, the best channels are searched for the office network 300 from the control channels of the surrounding macro cell network. The search for a good channel can, for instance, be started by selecting as the first channel the control channel CH1 of the base station 302A. If the connection established on the control channel exceeds the quality criteria set for it, it is selected for use in the office network. If a TDMA network were used, all time-slots of the frequency comprising the control channel (e.g. a BCCH channel) would then be selected for use in the office network. With reference to FIG. 3, when the control channel CH1 has been tested, the base stations of the office network are set on the control channel CH2 of the next macro cell base station 302B, and the next connection is established on it between the terminals within the coverage area of the office network. All or a part of the control channels in the surrounding macro cell network are gone through in this manner. In the example in FIG. 3, the macro cell network uses 7 control channels which would then all be tested in this manner. In the example in the figure, the base stations 302B and 302D are located furthest away from the office network and would most likely produce the best measurement results with minimum interference on calls made on the control channels, and the channels CH2 and CH4 would then be selected for use in the office network.

FIG. 4 shows the essential parts of the infrastructure of a cellular radio network for office use of the invention comprising a network management system 414, a data network 402, control means 404, a terminal 406, a base station 304, a base station controller 410 and a channel search application 412. It is obvious to a person skilled in the art that a cellular radio network also comprises other components and that the figure only shows the elements essential for the invention. The network management system 414 builds, manages and maintains the cellular-radio network. Building the network refers here to defining the base stations 304 as parts of the cellular radio network and configuring them so as to enable communication between the terminals 406 through them. The network management system 414 initiates the quality measurements on connections between the terminals 406 and the base stations 304 through the data network 402 and the terminal controller 404. In an embodiment, the terminals are connected with a serial cable, for instance, to the terminal controller which in an embodiment is a computer. In another embodiment, the terminals are not conventional subscriber terminals, but especially arranged to make the measurements, so as to make their management possible by the network management system through the data network and the terminal controller. The terminals 406 and the terminal controller 404 are preferably fixed to the office environment to make it possible to perform measurements weekly, for instance.

The network management system 414, also receives the measurement reports on the connection quality between the terminals 406 and the base stations 304, and the measurement reports are sent from the terminals 406 to the base stations 304 from which they are forwarded to the network management system 414 through the base station controller 410. Information between the network management system 414 and the terminal controller 404 is transmitted in the data network 402 which most preferably is an IP network. The use of a data network between the network management system and the terminal controller makes even great physical distances possible, thus making it possible to remote operate office networks.

The search for frequencies for cellular radio networks for office use is co-ordinated by the controller 412 which controls the method steps described in FIG. 2. It is not essential for the invention whether the controller 412 is separate from the network management system, as shown in FIG. 4, or whether it is a part of the network management system 414. Most preferably, the controller 412 is, however, configured in such a manner that it is a part of the network management system, and all network management system services and interfaces can be used directly from the application. In FIG. 4, a threshold value is first set for the controller 412 to evaluate the quality of the connections between the terminals 406 and the base stations 304. Before iterating the frequencies, the controller 412 commands the network management system 414 to switch the terminals 406 on through the terminal controller 404 and starts the evaluation of the quality of the connections between the terminals 406 and the base stations 304 for the desired terminals 406. The controller 412 first selects the frequency to be tested and commands through the network management system 414 the base stations 304 to use this frequency. After directing the terminals 406 to use the frequency being tested, the controller 412 establishes a connection between the terminals 406 through the base stations 304 with the help of the terminal controller 404 and the data network 402. The measurement information on connection quality received by the network management system 414 is transmitted to the controller 412 which compares the measurement report with the set threshold value and determines whether the established connection and, consequently, the tested frequency is good enough. The method steps shown in FIG. 2 are repeated under the control of the controller 412 until the required frequencies are found for the base stations 304 and the office base stations can be directed to use the found frequencies. Parts of the cellular radio network of the invention are preferably implemented by software run in a processor. Other parts can be implemented as hardware, for instance as an asic (application specific integrated circuit) or as a separate logic.

Even though the invention has been explained in the above with reference to examples in accordance with the accompanying drawings, it is obvious that the invention is not restricted to them but can be modified in many ways within the scope of the inventive idea disclosed in the attached claims.

What is claimed is:

1. A method for performing channel configuration in a micro or pico cell network located in the operating area of a macro cell network, comprising:

selecting, in the micro or pico network, as the channel to be tested, a logical control channel to be transmitted on the physical channel of a macro cell in the macro cell network, directing a base station of the micro or pico cell network and terminals within the coverage area of the base stations of the micro or pico cell network to use the control channel to be tested, establishing, by remote control, a connection between two or more terminals through base stations serving the terminals on the control channel being tested and making a measurement report on the quality of the connection, selecting, as the channel to be tested, the next control channel of a macro cell of the macro cell network until the control channels of all desired macro cells have been tested, determining, on the basis of the measurement reports, the control channels whose use guarantees the best range in the micro or pico cell network, directing the base stations of the micro or pico cell network to use the control channels of the macro call network guaranteeing the best range, and maintaining a data network connection between the terminals and the terminal controllers, wherein the terminal controller of the micro or pico cell network, controlling the operation of the terminals, is controlled through a data network connected to the micro or pico cell network.

2. A method as claimed in claim 1, wherein the macro cell network and the micro or pico cell network are controlled from the same location.

3. A method as claimed in claim 1, wherein the macro cell network and the micro or pico cell network are synchronised with each other.

4. A method as claimed in claim 1, wherein a BCCH (broadcast control channel) is used as the control channel of the macro cell network.

5. A method as claimed in claim 1, wherein office base stations are used as the base stations of the micro or pico cell network.

6. A method as claimed in claim 1, wherein mobile phones are used as the terminals.

7. A method as claimed in claim 1, wherein a threshold value that the connection quality must meet is used in evaluating the quality of the connection.

8. A method as claimed in claim 7, wherein a bit error ratio is used as the threshold value.

9. A method as claimed in claim 1, wherein the channel configuration of the micro or pico cell network is performed when configuring the micro or pico cell network.

10. A method as claimed in claim 1, wherein the channel configuration of the micro or pico cell network is performed at regular intervals.

11. A method as claimed in claim 1, wherein the physical channel of a macro cell is a time-slot of a radio frequency, and the logical control channel of the macro cell is directed to be transmitted at its time through each time-slot of said frequency.

12. A cellular radio network comprising one or more macro cell base stations, each coverage area being a macro cell and the macro cells forming a macro cell network; a micro or pico cell network operating in the operating area of the macro cell network, which micro or pico cell network comprises at least one base station and at least one terminal in radio connection with the base station, wherein the cellular radio network also comprises a controller coordinating the channel configuration, the controller comprising:

means for selecting, in the micro or pico cell network, as the channel to be tested, a logical control channel to be transmitted on a physical channel of the macro cell, means for directing the base station of the micro or pico cell network to use the control channel to be tested, means for establishing, by remote control, a connection between two or more terminals through the base stations serving the terminals on the control channel being tested, means for making a measurement report on the connection quality, means for selecting, as the control channel to be tested, the next control channel of a macro cell until the control channels of all desired macro cells have been tested, means for determining, on the basis of the measurement reports, the channels whose use guarantees the best range in the micro or pico cell network, means for directing the base stations to use the channels guaranteeing the best range, and means for maintaining a data network connection between the terminals and the terminal controllers, wherein the cellular radio network comprises a data network for transmitting information in the cellular radio network and a terminal controller for controlling the terminals, and the controller is arranged to control the terminal controller through the data network.

13. A cellular radio network as claimed in claim 12, wherein the cellular radio network comprises a network management system for managing the macro cell network and the micro or pico cell network.

14. A cellular radio network as claimed in claim 13, wherein the network management system is arranged to synchronise the cellular radio network and the macro cell network.

15. A cellular radio network as claimed in claim 12, wherein the control channel of the macro cell network is a BCCH (broadcast control channel).

16. A cellular radio network as claimed in claim 12, wherein the base stations of the micro or pico cell network are office base stations.

17. A cellular radio network as claimed in claim 12, wherein the terminals are mobile phones.

18. A cellular radio network as claimed in claim 12, wherein the controller is arranged to use in evaluating the quality a threshold value that the connection quality must meet.

19. A cellular radio network as claimed in claim 18, wherein the controller is arranged to use a bit error ratio as the threshold value in evaluating the quality of the connection.

20. A cellular radio network as claimed in claim 12, wherein the controller comprises means for performing channel configuration when configuring the cellular radio network.

21. A cellular radio network as claimed in claim 12, wherein the controller comprises means for performing channel configuration of the cellular radio network at regular intervals.

22. A cellular radio network as claimed in claim 12, wherein the physical channel of the macro cell is a time-slot of a radio frequency, and the logical control channel is directed to be transmitted at its time through each time-slot of said frequency.

* * * * *